(12) United States Patent
Jandrell

(10) Patent No.: US 6,459,704 B1
(45) Date of Patent: *Oct. 1, 2002

(54) METHOD AND SYSTEM FOR RADIO-LOCATION DETERMINATION

(75) Inventor: Louis H. M. Jandrell, Dallas, TX (US)

(73) Assignee: Spectrum Tracking Systems, Inc., Carrollton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,066

(22) Filed: Aug. 12, 1997

(51) Int. Cl.$^7$ .................. H04L 12/413; H04B 1/713

(52) U.S. Cl. .................. 370/445; 370/343; 370/448; 375/132; 455/67.1

(58) Field of Search ................. 370/252, 343, 370/344, 349, 387, 445, 447, 462, 480, 448, 497, 338; 375/202, 132, 130; 435/67.1, 67.3, 67.6

(56) References Cited

U.S. PATENT DOCUMENTS

| | | | |
|---|---|---|---|
| 2,298,840 A | 10/1942 | Purcell | 177/360 |
| 3,573,620 A | 4/1971 | Ashley et al. | 325/53 |
| 3,810,161 A * | 5/1974 | Sahasrabudhe | 340/825.7 |
| 3,833,895 A | 9/1974 | Fecteau | 340/224 |
| 3,848,231 A | 11/1974 | Wootton | 340/164 R |
| 3,914,692 A | 10/1975 | Seaborn, Jr. | 325/53 |
| 3,925,763 A | 12/1975 | Wadhwani et al. | 340/164 R |
| 4,034,376 A * | 7/1977 | Barton | 342/444 |
| 4,334,221 A | 6/1982 | Rosenhagen et al. | 340/825.72 |
| 4,367,458 A | 1/1983 | Hackett | 340/539 |
| 4,396,910 A | 8/1983 | Enemark et al. | 340/539 |
| 4,409,592 A | 10/1983 | Hunt | 340/825.5 |
| 4,468,656 A | 8/1984 | Clifford et al. | 340/539 |
| 4,523,184 A | 6/1985 | Abel | 340/539 |
| 4,611,198 A | 9/1986 | Levinson et al. | 340/539 |
| 4,622,538 A | 11/1986 | Whynacht et al. | 340/506 |
| 4,630,035 A | 12/1986 | Stahl et al. | 340/539 |
| 4,670,739 A | 6/1987 | Kelly, Jr. | 340/539 |
| 4,670,906 A * | 6/1987 | Thro | 455/525 |
| 4,672,654 A | 6/1987 | Vanacore | 379/49 |
| 4,694,282 A | 9/1987 | Tamura et al. | 340/539 |
| 4,750,147 A | 6/1988 | Roy, III et al. | 364/807 |
| 4,764,757 A | 8/1988 | DeMarco et al. | 340/574 |
| 4,797,948 A * | 1/1989 | Milliorn et al. | 455/38.1 |
| 4,806,938 A | 2/1989 | Meadows | 342/370 |
| 4,868,885 A * | 9/1989 | Perry | 455/10 |
| 4,876,549 A | 10/1989 | Masheff | 342/417 |
| 4,884,060 A | 11/1989 | Shapiro | 340/514 |

(List continued on next page.)

FOREIGN PATENT DOCUMENTS

| | | |
|---|---|---|
| EP | 0 314 217 | 5/1989 |
| FR | 2433-795 | 8/1978 |
| JP | 5-304514 | 5/1993 |
| JP | 7-154297 | 7/1995 |
| WO | WO 94/09568 | 4/1994 |
| WO | WO 95/01020 | 1/1995 |
| WO | WO 96/04717 | 2/1996 |
| WO | WO 96/22662 | 7/1996 |

Primary Examiner—Hassan Kizou
Assistant Examiner—Saba Tsegaye
(74) Attorney, Agent, or Firm—Arter & Hadden LLP

(57) ABSTRACT

A method for prioritizing multiple access to a communication channel for the transmission of packets from a plurality of devices on the communication channel. It comprises the steps of once a packet is ready to be transmitted over a communications channel, sensing if a channel is idle, waiting for a predetermined (prioritizing) time after sensing the channel is idle and then transmitting the packet only if the channel is sensed to still be clear at the end of that (prioritizing) time. A scheme is also described for applying an efficient frequency hopping technique to the method for use on congested, shared radio-bands requiring spread spectrum techniques for access to the band.

14 Claims, 14 Drawing Sheets

U.S. PATENT DOCUMENTS

| | | | | |
|---|---|---|---|---|
| 4,908,602 A | | 3/1990 | Reich et al. | 340/514 |
| 4,952,928 A | | 8/1990 | Carroll et al. | 340/825.54 |
| 4,965,732 A | | 10/1990 | Roy, III et al. | 364/460 |
| 4,990,892 A | | 2/1991 | Guest et al. | 340/573 |
| 4,998,095 A | | 3/1991 | Shields | 340/574 |
| 5,051,741 A | | 9/1991 | Wesby | 340/825.49 |
| 5,055,851 A | | 10/1991 | Sheffer | 342/457 |
| 5,115,223 A | | 5/1992 | Moody | 340/573 |
| 5,115,224 A | | 5/1992 | Kostusiak et al. | 340/574 |
| 5,150,310 A | * | 9/1992 | Greenspun et al. | 342/451 |
| 5,223,816 A | | 6/1993 | Levinson et al. | 340/539 |
| 5,229,993 A | | 7/1993 | Foudriat et al. | 370/85.3 |
| 5,317,323 A | | 5/1994 | Kennedy et al. | 342/457 |
| 5,365,217 A | | 11/1994 | Toner | 340/539 |
| 5,394,433 A | * | 2/1995 | Bantz et al. | 375/132 |
| 5,416,466 A | | 5/1995 | Malvaso et al. | 340/539 |
| 5,416,468 A | | 5/1995 | Baumann | 340/573 |
| 5,434,787 A | * | 7/1995 | Okamoto et al. | 701/214 |
| 5,444,450 A | * | 8/1995 | Olds et al. | 342/357 |
| 5,467,074 A | | 11/1995 | Pedtke | 340/539 |
| 5,471,469 A | * | 11/1995 | Flammer, III et al. | 370/346 |
| 5,483,223 A | | 1/1996 | Pedtke | 340/539 |
| 5,533,025 A | * | 7/1996 | Fleek et al. | 370/445 |
| 5,546,090 A | | 8/1996 | Roy, III et al. | 342/174 |
| 5,572,192 A | | 11/1996 | Berube | 340/574 |
| 5,617,100 A | * | 4/1997 | Akiyoshi et al. | 342/357 |
| 5,629,707 A | * | 5/1997 | Heuvel et al. | 342/357.16 |
| 5,719,882 A | * | 2/1998 | Ellis | 714/749 |
| 5,852,723 A | * | 12/1998 | Kalkunte et al. | 709/235 |
| 5,870,426 A | * | 2/1999 | Yokev et al. | 375/202 |
| 5,875,184 A | * | 2/1999 | Altvater et al. | 370/330 |
| 5,912,918 A | * | 6/1999 | Bauchot et al. | 375/202 |
| 5,963,560 A | * | 10/1999 | Kalkunte | 370/448 |
| 5,966,375 A | * | 10/1999 | Kagaya | 370/338 |
| 5,999,126 A | * | 12/1999 | Ito | 342/357.1 |
| 6,006,096 A | * | 12/1999 | Trompower | 455/456 |
| 6,088,591 A | * | 7/2000 | Trompower et al. | 455/438 |
| 6,157,616 A | * | 12/2000 | Whitehead | 370/252 |
| 6,292,508 B1 | * | 9/2001 | Hong et al. | 375/134 |

* cited by examiner

METHOD AND SYSTEM FOR RADIO-LOCATION DETERMINATION

FIELD OF THE INVENTION

The field of the invention is the radio tracking of remotely located devices. Specifically, this invention relates to channel-acquisition and channel-access methods used by large numbers of unsynchronized radio-transceivers, operating in a shared radio-band environment, to communicate with sensing and locating devices in a location-tracking network.

BACKGROUND OF THE INVENTION

Personal safety has become a visible concern for many in society, particularly those who frequent public places such as college campuses. Many personal-safety devices have been proposed and marketed which seek to alleviate these concerns. One important requirement for all safety devices is to provide an alarm that allows authorities to provide a prompt response.

Once an alarm has been received, the overriding goal for authorities is to promptly determine the location of the emergency call. Once the person's location is known, steps can be taken to provide appropriate aid in a reliable and timely manner. Additionally, any location determination system must instill users with enough confidence that attempts to use the system will be successful.

While it is a conceptually simple task to transmit a signal that can be tracked in an interference free environment, practical problems exist. For example, there is an increasing demand for the transmission spectrum by a myriad of types of wireless services, to the point where many bands must be shared to allow many wireless services to be offered. This sharing results in a complex communications environment, and many sophisticated techniques must be employed to ensure that systems will continue to operate reliably in spite of the "signal degradation" caused by the wireless environment. Signal interference problems also exist. For example, interference can originate from other parts of the same system, from other compatible systems, such as might occur due to nearby campuses operating the same kind of system at each campus, from incompatible systems such as cordless telephones or point-to-point data links that typically also use the shared-band, and from equipment operating at higher power levels outside of the band (spurious radiation).

A variety of access methods have been previously used in the data and wireless fields. For example, a multiple access method known as ALOHA, is well known. In this simple method, which is effective for access to a medium that has little demand, a transmission is made whenever the data is ready, and the success of the transmission is based on the receipt of a positive acknowledgment of receipt of the message. If the acknowledgment is negative, indicating that either the message was not received and there was no acknowledgment, or that the message was received corrupted, then the mechanism will re-try, but with a scheme for backing off by a random delay, to prevent the system from "choking". When media traffic increases, significant numbers of messages are corrupted by this method, and overall throughput falls to very low levels, with most of the time being spent on re-try attempts.

An improved method, Carrier Sense Multiple Access (CSMA), first senses whether a transmission is in progress before attempting to transmit, thereby preventing to large degree, the corruption of messages already in the process of transmission. However, this method can waste some of the system's capacity when a medium number of transmissions are attempted since the algorithm waits a significant length of time before re-attempting transmission.

Another algorithm used for multiple access to a frequency channel is p-persistent CSMA. Two constants are used with this algorithm: T, the end-to-end propagation delay of the bus, and p, a specified probability. A station using the p-persistent algorithm senses the channel and then the following occurs. If the channel is sensed idle, a random number between zero and one is chosen. If the selected number is less than p, the packet is transmitted; if not, the station waits T seconds and repeats the complete algorithm (which includes the contingency that the channel may be busy). Also, if the channel is busy, the station persists in sensing the channel until it is found to be idle and then proceeds as described above.

The p-persistent algorithm also uses the sense information to avoid transmitting when the channel is busy. It differs from the nonpersistent algorithm (which never persists in transmitting since it always backs off), by persisting in attempting to transmit. When the channel becomes free, this fact is immediately sensed by a station using the p-persistent algorithm. To avoid collisions with other ready stations that are employing the same strategy, or at least to inject flexibility into the algorithm, a station transmits only with probability p when the channel becomes free.

The delay T is chosen so that two stations sensing the channel to be free at the same time will not collide if one transmits and the other delays. In time T the leading edge of the transmission from the transmitting station will reach the sensor of the second station and the sensed signal will prevent it from transmitting. The parameter p can be chosen to optimize the algorithm for the application and its message traffic patterns.

SUMMARY OF THE INVENTION

It is an object of the invention to provide a low interference-potential mechanism for multiple access by unsynchronized locator-transceivers using the frequency hopping techniques required for shared band-use.

It is a further object of the invention to significantly reduce effects of interference while operating in the ISM band, to enhance communication reliability.

It is still another object of the invention to provide a reliable spread-spectrum signaling technique for tracking the location of the locator-transceiver.

It is yet another object of the invention to provide a simple mechanism for prioritizing access of different classes of transmission.

It is a further object of the invention to provide a tracking system that is quickly and reliably locates people using the radio-transceiver.

It is another object of the invention to provide a device that allows security personnel to quickly come to the aid of people who experience a threat to their personal safety anywhere in or near a campus or similar environment.

It is a further object of the invention to provide a device which, when activated, transmits an identification signal whose source location can be remotely determined and tracked with enough precision for security personnel to quickly come to the aid of the person who activated it.

It is still another object of the invention to provide a system that is reliable and offers an on-demand confidence-test feature.

It is yet another object of the invention to provide a system that is both robust and user-friendly.

It is another object of this invention to effectively minimize the creation of interference in the shared band in which it operates, thereby ensuring communications-reliability, while still maximizing the throughput of the system.

It is another object of this invention to effectively minimize the deleterious effects of interference inherent in the shared band in which it operates, thereby ensuring communications-reliability,, while still maximizing the throughput of the system.

It is still another object of the present invention to provide a system for locating an alarm call which uses of a number of different wireless locating technologies.

It is still another object of the invention to provide a system which uses shared radio-communication bands.

These and other objects of the invention are provided by a system for determining the location of a device comprising means for transmitting a location determination transmission over a communication channel; a plurality of detection device for receiving said location determination transmission; and means for prioritizing access to said communications channel including means for having said remote device wait to transmit over said communication channel for a predetermined period.

DESCRIPTION OF THE PREFERRED EMBODIMENTS

Figure 1:
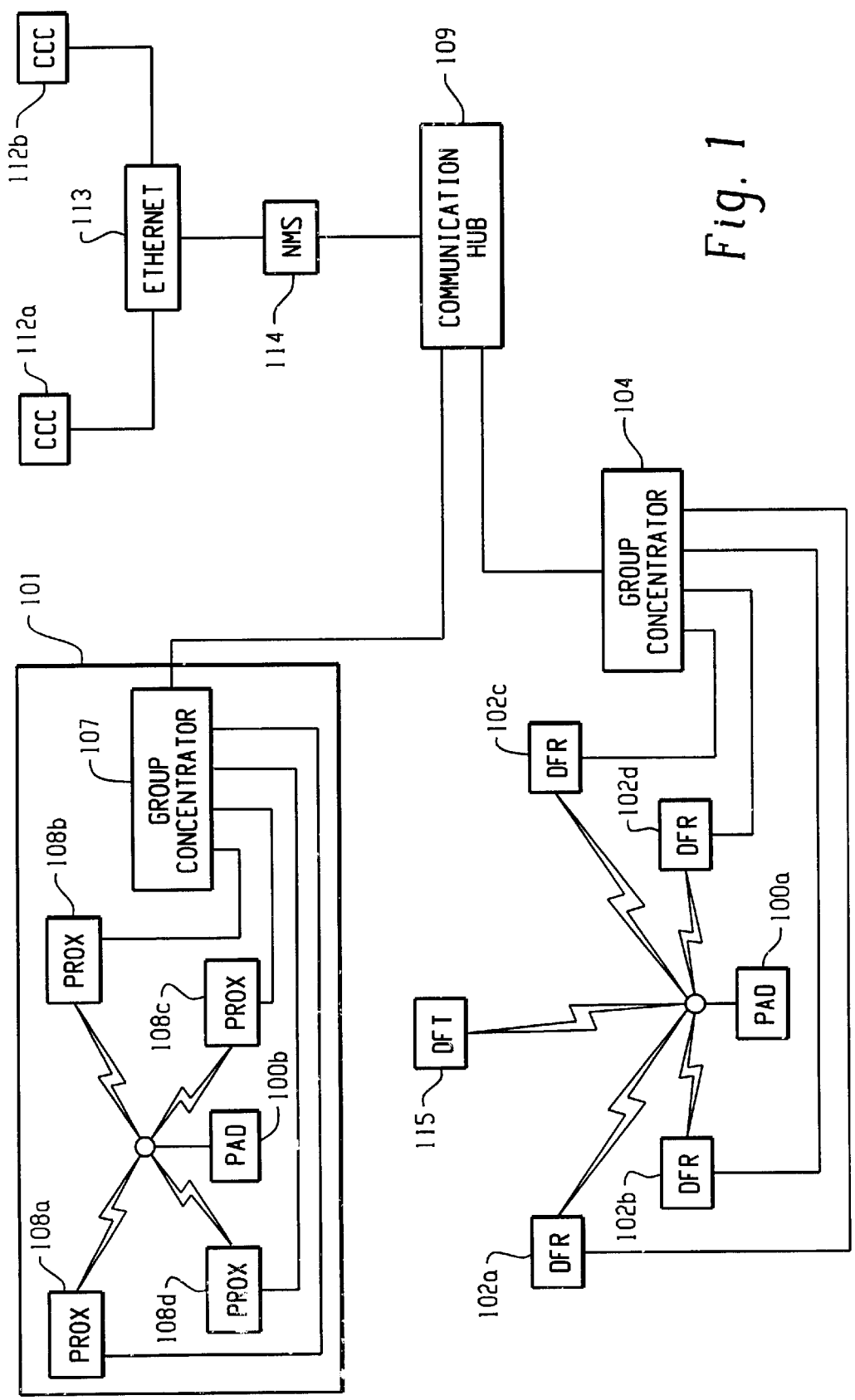
FIG. 1 depicts a block diagram of the major components of the network according to principles of the present invention.

Referring now to FIG. 1, Proximity Receiver Controller Transmitters (PROXs) 108a, 108b, 108c, and 108d, located inside a building 101, receive RF signals transmitted from a Personal Alarm Device (PAD) 100b which is also located inside the building 101.

The PROXs 108a, 108b, 108c, and 108d determine the PAD identity and PAD signal strength, then send this data to a group concentrator 107 which concentrates the data for transmission to a communication hub 109. The communication hub 109 routes the data to a Network Management System (NMS) 114 via a wire or wireless link. PROXs are advantageously located in the interiors of buildings where the uncertain attenuation and path of a signal makes detection by external receivers difficult. Although preferably used in building interiors, the PROXs may be placed outside of the building 101, in parking lots, for example.

Multiple PROXs are installed on nearly every floor of a building; the exact number and location of the PROXs depends on the layout and signal propagation properties of a particular building. The PROXs provide estimates of a PAD's signal strength, estimates measured over multiple frequencies used in each transmission from the PAD, as further explained below. The estimates are transmitted to the NMS where the signal strength estimates from all the PROXs receiving the PAD's signal are used in a signal-strength-vs-distance technique, well known in the art, to accurately estimate of the PAD's location.

The signal strength data received by PROXs 108a–108d is used by the NMS 114 to estimate the PAD's location in the building; this estimated location is then sent by the NMS 114 to Command and Control Centers (CCCs) 112a and 112b for display. If the RF signal transmitted by the PAD 100b leaves the building, then Direction Finding Receivers (DFRs) 102a, 102b, 102c, and 102d detect the signal and provide location data to a data concentrator 104 which concentrates the data from the various DFRs, then to communication hub 109 which routes the data to the NMS 114. The NMS 114 uses this data to confirm the in-building location estimate of PAD 100b.

The PAD 100b transmits frequency-hopped signals which can originate on any of the minimum number of frequency channels required for shared-band use of the spectrum (typically 50 channels). In order to quickly "hear" a transmission, the PROXs and DFRs rapidly scan all of the frequency channels for possible transmissions.

Another PAD 100a, also transmitting frequency-hopped signals, is located outside of building 101, and transmits RF signals to the DFRs 102a, 102b, 102c, and 102d which rapidly scan a set of frequency-hopped channels for a signal, then estimate the time-of-arrival (TOA), and angle-of-arrival (AOA) of the signal. The DRFs 102a, 102b, 102c, and 102d are preferably located on radio towers and receive signals of PADs located beyond the receiving range of PROXs 108a–108d. Typically, three to five DFRs are used in a network that covers an area the size of a college campus. Of course, the number of DFRs can be varied to increase or decrease the network coverage area.

As stated above, the DFRs 102a–102d estimate the TOA and/or AOA of the signal transmitted by the PAD 100a. Two such estimates of AOA and three of TOA are sufficient to estimate the location of the signal source. However, the quality of the location estimate can be significantly improved when more estimates are available. The DFRs 102a–102d are preferably hard-wired to the group concentrator 104 where data is concentrated. The group concentrator 104 is coupled to communication hub 109 which routes the data to the NMS 114. Although hard-wiring is preferred, any type of communication link can be used for the connection. Additionally, the DFRs 102a–102d determine an identification number of the PAD 100a, and any additional data from the transmitting device, and an estimate of the absolute signal level. The DFRs 102a–102d send this information to the NMS 114 where the location can be estimated by multiple techniques; e.g. triangulation from the angle-of-arrival (AOA) estimates; the maximum-likely-position based on both absolute and relative signal strength estimates; and multilateration from the time-of-arrival (TOA) estimates from the different DFRs 102a–102d that report an event. As more measurement methods and points of measurement are used, such as use of relative phase of arrival of signals, or AOA information from additional DFRs, this additional information is used to increase the accuracy and reliability of the location estimates, by any of a variety of well known location-solution-optimization methods.

The NMS 114 also manages the operations of the network and can be located at a CCC 112 where operations of the network are controlled and monitored. Communication links 116 couple PROXs 108a–108d to the NMS 114, and can be point-to-point wireless, power-line communication, or hard-wired links.

The NMS 114 is connected to an ethernet network 113, and the CCCs 112a and 112b are also connected to the ethernet network 113. Thus, the CCCs 112a and 112b can be configured as master and slave CCCs and can be located anywhere along the ethernet network 113.

The PADs 100a and 100b may be transmit-only devices or, preferably, a two-way, transmit-receive devices. Whereas the transmit only device must rely on some form of external, secondary confirmation of the device's operation, the two-way device provides confirmation of the network operation at the device, in addition to possibility of providing other operational features. All PADs are battery operated with the battery having a long life, preferably, of at least one school year. The PADs batteries are recycled at the end of the school year or after an emergency call to ensure that the PADs are always operational.

The PADs 100a and 100b transmit alarm and confidence-test transmissions. When the user activates an alarm call, the PAD continuously transmits the signal used to locate the person. By "continuously" it is meant to include not only unbroken transmissions but also to include short (low duty-cycle) transmissions repeated frequently, which minimize the use of spectrum while still transmitting frequently enough for the personnel, coming to the aid of the caller, to track the signal through the network or with a hand-held tracking device. The PAD can also be activated to transmit a much shorter test signal to receive confirmation of the proper operation of the device and the network. The duration of an alarm could be as long as 30 minutes, even at the end of the school year (near the end of the battery's life expectancy). The alarm transmission carries the PAD identification number and an alarm type opcode.

A hand-held, signal-strength-only, or, signal-strength and direction-finding tracking device (DFT) 115, is used to locate PADs within the area of coverage. The DFT is used by the security operator to physically "home-in" on the PAD 100a transmitting an alarm.

The confidence-test transmission is used to confirm the operation of the PAD. The confidence test signal transmission is made for a one-second duration and is transmitted sequentially across ten hopped frequency channels (for multi-path fading diversity and for compliance with the shared band access rules.) Each hop consists of eight repeats of the preamble, op-code, transmission-counters and PAD identification number and checksums. Each time a confidence test signal is initiated, a different set of hopped frequencies are used, so that at least 50 different frequencies are used with about equal probability, as required for shared-band use. The confidence-test transmissions carry the PAD identification number and a confidence-test type opcode.

Figure 2:
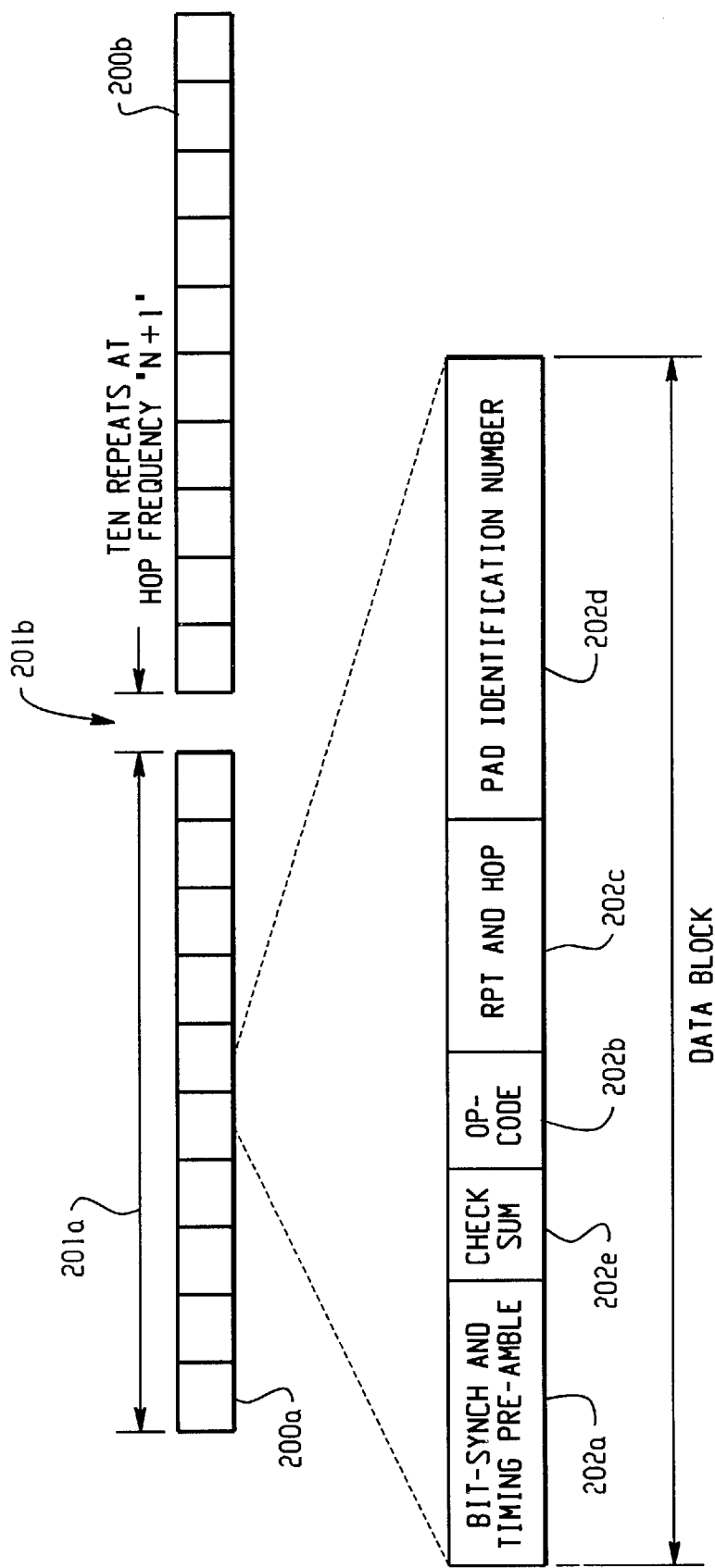
FIG. 2 is a diagram of the structure of the data block according to principles of the present invention.

Frequency hopping techniques are used by the network to ameliorate the effects of signal "collisions" which inevitably occur with shared access to a communication band. Therefore, the PADs 100a and 100b transmit a narrow-band frequency hopped signal as detailed in FIG. 2. A series of data blocks 200a–200j are transmitted at a hop frequency N. After transmitting these data blocks, the hop frequency is changed to hop frequency N+1 after a hop transmission interval. Preferably, the hop transition interval is less than 1 ms.

A data block comprises a 64-bit preamble 202a which includes the bit-synch acquired by the system and timing information and may include a Barker code start flag. The purpose of the long preamble in the data structure is to provide a repetitive signal on which phase and angle of arrival measurements can be accurately made. The data block also includes a 8-bit opcode 202b which indicates the type of transmission. The "operation-code type" of transmission may, for example, be a confidence test transmission or an alarm transmission, or any other signaling type that may be used by the system, such as message-paging. The opcode 202b is followed by the checksum bit field 202e which provides for data validity checking by the receiver. The checksum is followed by a 16-bit repeat-count and hop-count field 202c which indicates the next hop frequency and the current repeat count showing the number of blocks transmitted at the current hop frequency. The repeat-and-hop field 202c is followed by 32-bit ID address field 202d which identifies the PAD sending the message. This data-block will be repeated multiple (eight) times in each hop transmission burst (the whole hop-dwell time). This data structure can be modified to include changes to the duty-factor of the alarm-call transmission, where either the maximum dwell time can be reduced, while keeping the hop time fixed, or keeping the dwell time and increasing the hop-transition time to multiple hop times in duration.

One illustrative embodiment of the present invention using the data block structure described above provides a channel bandwidth of 25 kHz, the number of hop channels of at least 50, a maximum dwell time of less than 400 ms, a MSK modulation of 15.625 kBPS, and a user data rate of 15.625 kBPS. The series of data blocks transmitted at hop frequency N occurs for 108.5 ms.

Since the transmission is relatively narrow-band, it is subject to severe multi-path fading indoors. The effects of multi-path fading are greatly ameliorated by the frequency-hopping access technique of the present invention, since it requires transmitting the signal successively on multiple narrow band channels. To maximize the multipath amelioration benefit, the hop frequencies are widely spaced in frequency (in accordance with the frequency-hopping requirements) to obtain maximum multi-path diversity. By using only the maximum estimated-signal-level readings from the multiple readings taken at the different frequencies of a single test or alarm transmission, the variance in estimated signal strength (with distance) is significantly reduced. Such lower variance translates to improved uniformity of results of the absolute and relative-signal-strength location estimation algorithms.

Figure 3A:
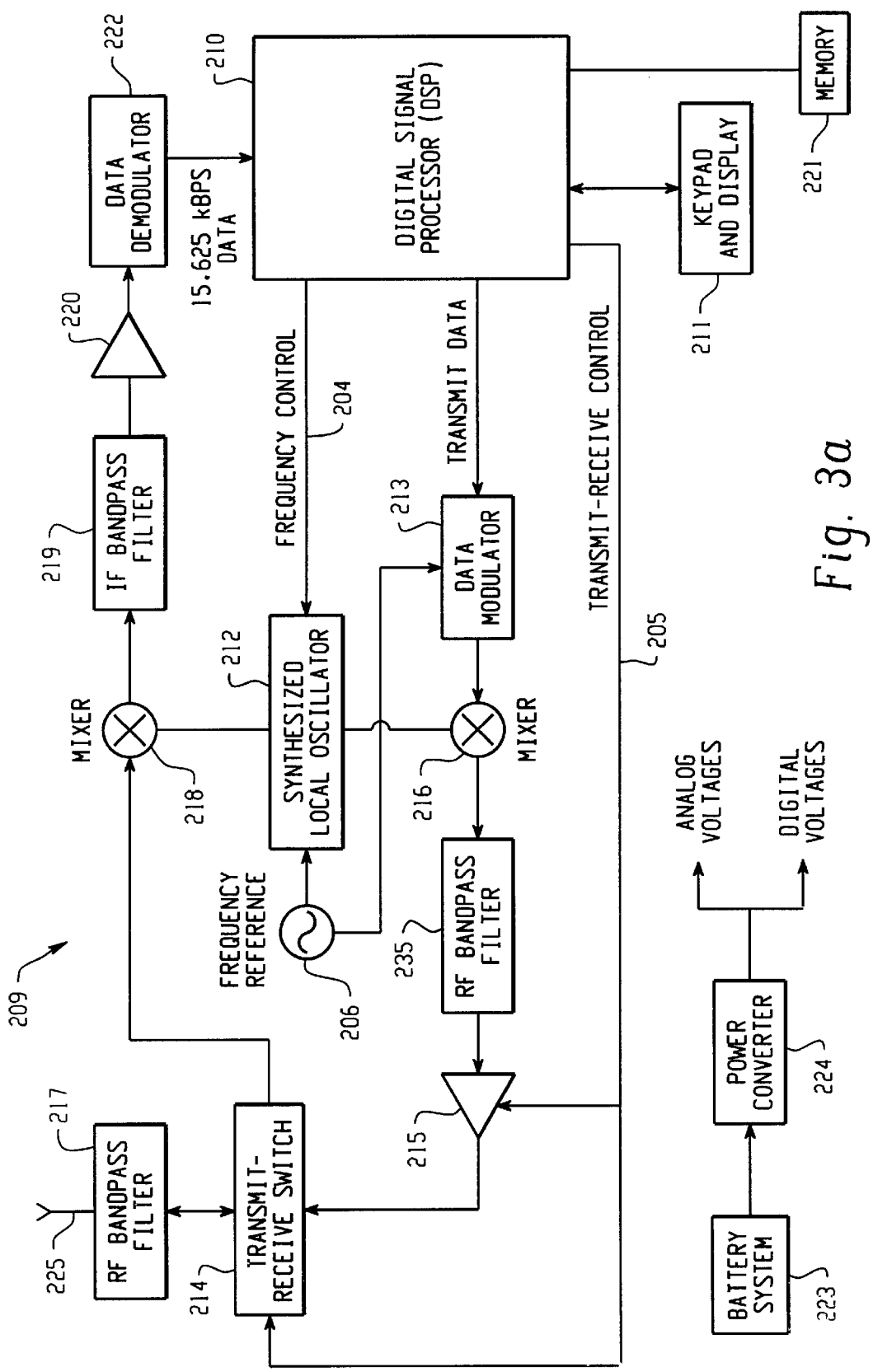
FIG. 3a is a block diagram of a Personal Alarm Device (PAD) according to principles of the present invention.

Turning now to FIG. 3a, a PAD comprises a frequency-hopped spread spectrum transceiver 209 that operates in the 902–928 MHz "Industrial Scientific & Medical" (ISM) band which allows for low-powered spread spectrum communication with minimum licensing requirements. This band is occupied by a number of services that share the band, under a set of technical-usage/access-rules set by the FCC.

A digital signal processor (DSP) 210 manages all the activities of the transceiver 209, based on programs stored in a DSP memory 221. The programs implement the prioritized frequency-hopped CSMA communication protocols, the data coding function, the real-time transceiver control activities and interaction with a key pad and display 211. Interaction commands received from the key pad and display 211 are converted into transmission or reception actions.

To transmit a signal, the DSP 210 initializes a synthesized local oscillator 212, which is supplied by a frequency reference 206, to the desired hop frequency, as required by the frequency-hopping protocol. The DSP 210 presents the data to be sent to a modulator 213, switches a transmit/receive (T/R) switch 214 to a "transmit" position and applies power to a power amplifier 215. The data is mixed with the signal from local oscillator 212 by a mixer 216, transmitted through a bandpass filter 235 which filters out unwanted signals, and then sent through the amplifier 215. The signal is then transmitted through the T/R switch 214 (which is in the "transmit" position), through a RF bandpass filter 235 which minimizes any unwanted noise or harmonics, and, finally, to an antenna 225 for transmission. The miniature antenna is sized to transmit and receive signals in the 902–928 MHz band.

When the DSP 210 requires reception, it routes signals from the antenna 225, through the filter 217, through the T/R switch 214 which is set to a "receive" position. The transmit receive switch 214 is set by DSP 210 via transmit-receive control 205. The RF signal is then mixed down in a double conversion to the desired frequency (typically a 45 MHz and 455 Khz intermediate frequency) at mixer 218 with a signal from the synthesized local oscillator 212, applied through a IF bandpass filter 219 and limiting-IF-amplifier 219. The signal is then processed by demodulator 222 to yield a 15.625 kBPS data signal. The data is then decoded by the DSP 210, and further action is determined according to the stored programs in the DSP memory 221.

The PAD derives power from a battery system 223, which preferably produces an output voltage of 6 volts, and converter 224 and provides interaction with the user through a set of push-buttons and LED indicator lights. The transmit power level is necessarily limited by the small battery and operating time limitations to about 100 milliwatts of output.

Figure 3B:
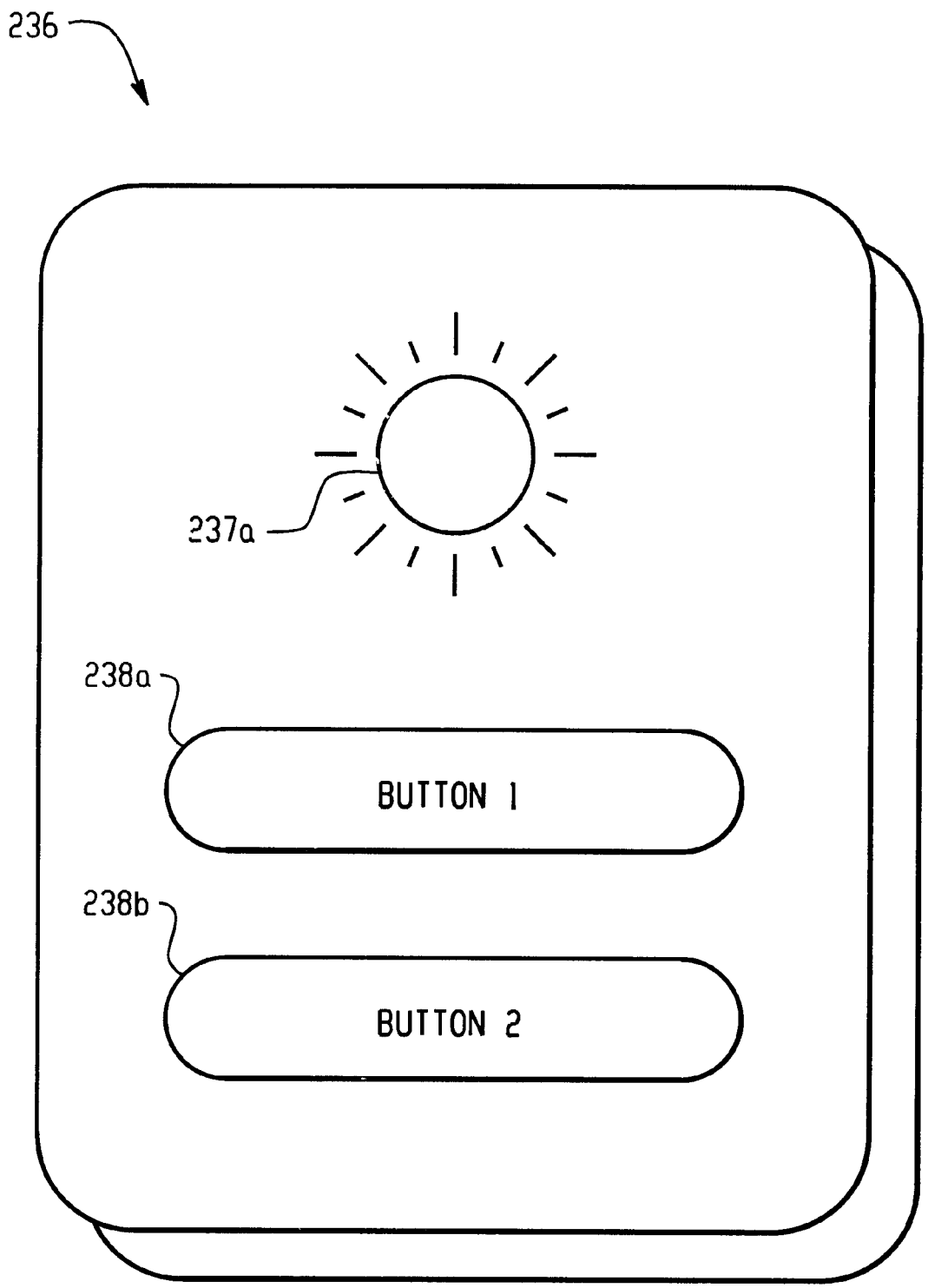
FIG. 3b is a pictorial view of one possible embodiment of the Personal Alarm Device (PAD) according to principles of the present invention.

Referring now to FIG. 3b, the PAD 236 comprises LED light 237a which indicates that the unit is transmitting and a first push button 238a and a second push button 238b. The user presses both buttons simultaneously to send and alarm and one button after another button to initiate a test. The PAD is small, compact and battery powered. The life of the battery is preferably at least a school year in duration. To achieve such a lifetime, the maximum transmit power of the alarm call device will necessarily be quite limited. However, the signal must be powerful enough to be adequately received at reasonable distances, even inside buildings. With a small lithium battery, a 100 mw transmit level would satisfy the signal-range requirements and make possible confidence testing once a day through-out the school year, and still provide an alarm transmission of 30 minutes duration, even at the end of the school year.

Figure 4A:
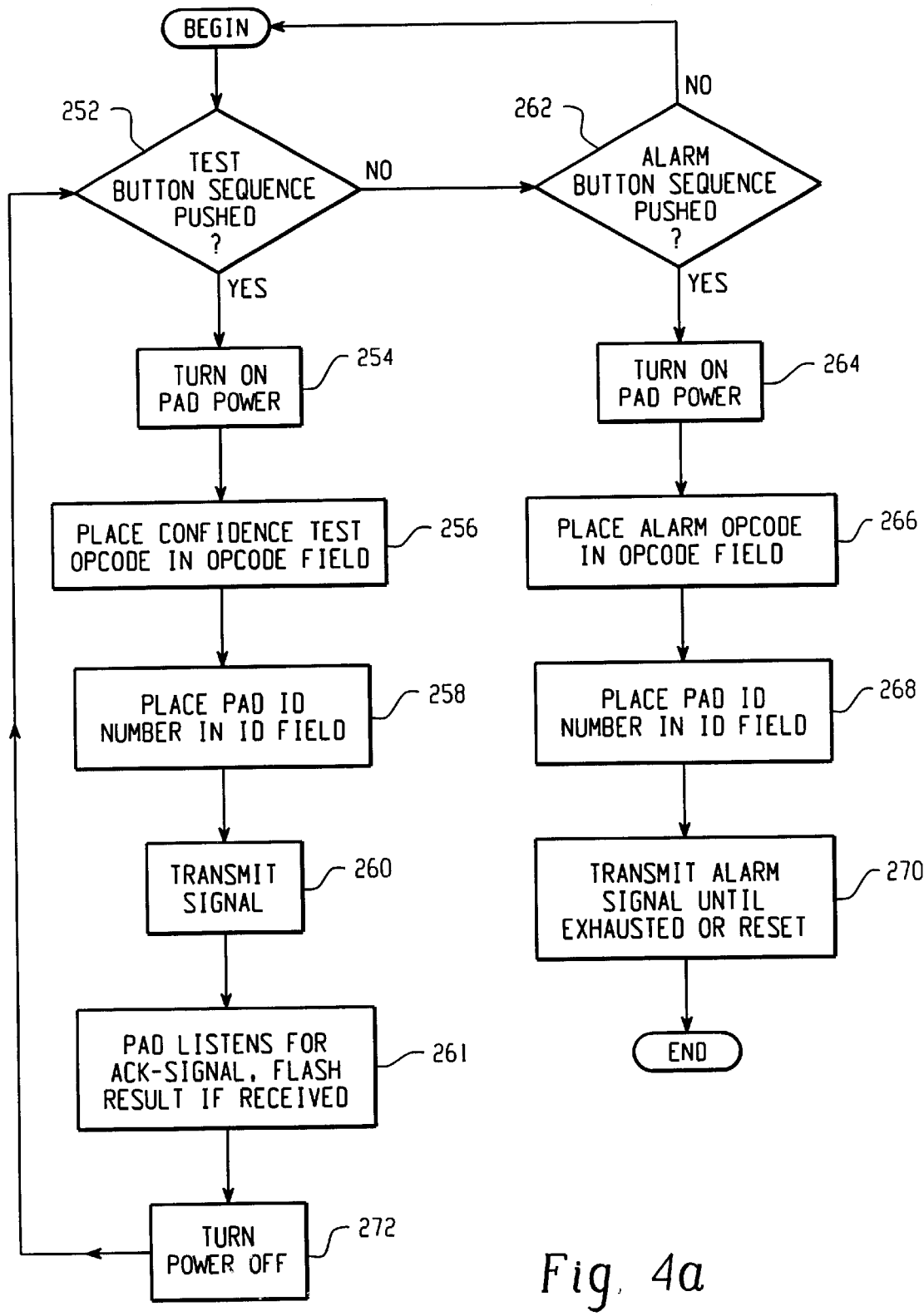
FIG. 4a is a flowchart depicting the transmit-only mode of the operation of the Personal Alarm Device (PAD) according to principles of the present invention.

Referring now to FIG. 4a, the PAD determines at step 252 whether the confidence-test button on the PAD has been pushed. If affirmative, at step 254, power to the transceiver is turned on. Then, at step 256, the confidence test opcode is placed in the opcode field of the data block. The PAD's identification number is placed in the identification field at step 258. Next, the confidence test signal is transmitted at step 260, according to the prioritized-access method described in this invention. Prior to transmission, the PAD's receiver listens for an absence of other carriers on the transmit channel prior to enabling the transmitter, in accordance with the method of this invention, so avoiding unnecessary signal collisions. As described above, the PROX receives, decodes and validates the confidence test transmission, and transmits an acknowledgment signal (ACK) with the PAD's identification number, back to the PAD, on the last frequency channel used by the PAD in its hopping sequence. The PAD's receiver "listens" for the ACK signal and displays the result of the test by flashing the test indicator momentarily at step 261. Then, power to the PAD is turned off at step 272. Control returns to step 252 and button scanning resumes as described above. This access method provides a large number of PADs with equal probability of access to the channel, while the prioritizing algorithm of this invention, described below, allows "alarm transmissions" priority over all "confidence-test transmissions."

If step 252 is negative, the flow moves to step 262 which determines whether the alarm button on the PAD has been pressed. If step 262 is negative, the system continues scanning with step 252. If step 262 is affirmative, control continues with step 264 where power is turned on to the PAD. Next, at step 266, the alarm opcode is placed in the opcode field of the data block. Then, at step 268, the PAD's identification number is placed in the identification field of the data block. Next, at step 270, the PAD transmits the alarm signal (again, according to the prioritized-access method described in this invention,) until the battery is exhausted or until the PAD's transmission is reset. Execution then ends (and, for user confidence, the PAD's batteries must be recycled).

Once an alarm has been identified and displayed on the CCC monitors (computer-generated campus displays), the operations personnel can elect to dispatch the nearest security personnel (probably aided by a hand tracking device) to the aid of the caller. This is accomplished through conventional two-way voice communication between personnel at the CCC and emergency personnel as is known to those skilled in the art.

In the event of an alarm transmission, the PAD transmission is the same as for the confidence test, but repeats "continuously", allowing the PROX to hear it at least five times per second. This great redundancy allows the possibility of some power saving in the PAD by reducing the duty-cycle of the PAD's alarm transmission by, for example, reducing the number of data-block repetitions per hop, or introducing a delay at the end of each transmission before hopping to the next channel—i.e. increasing the hop-transition interval.

Figure 4B:
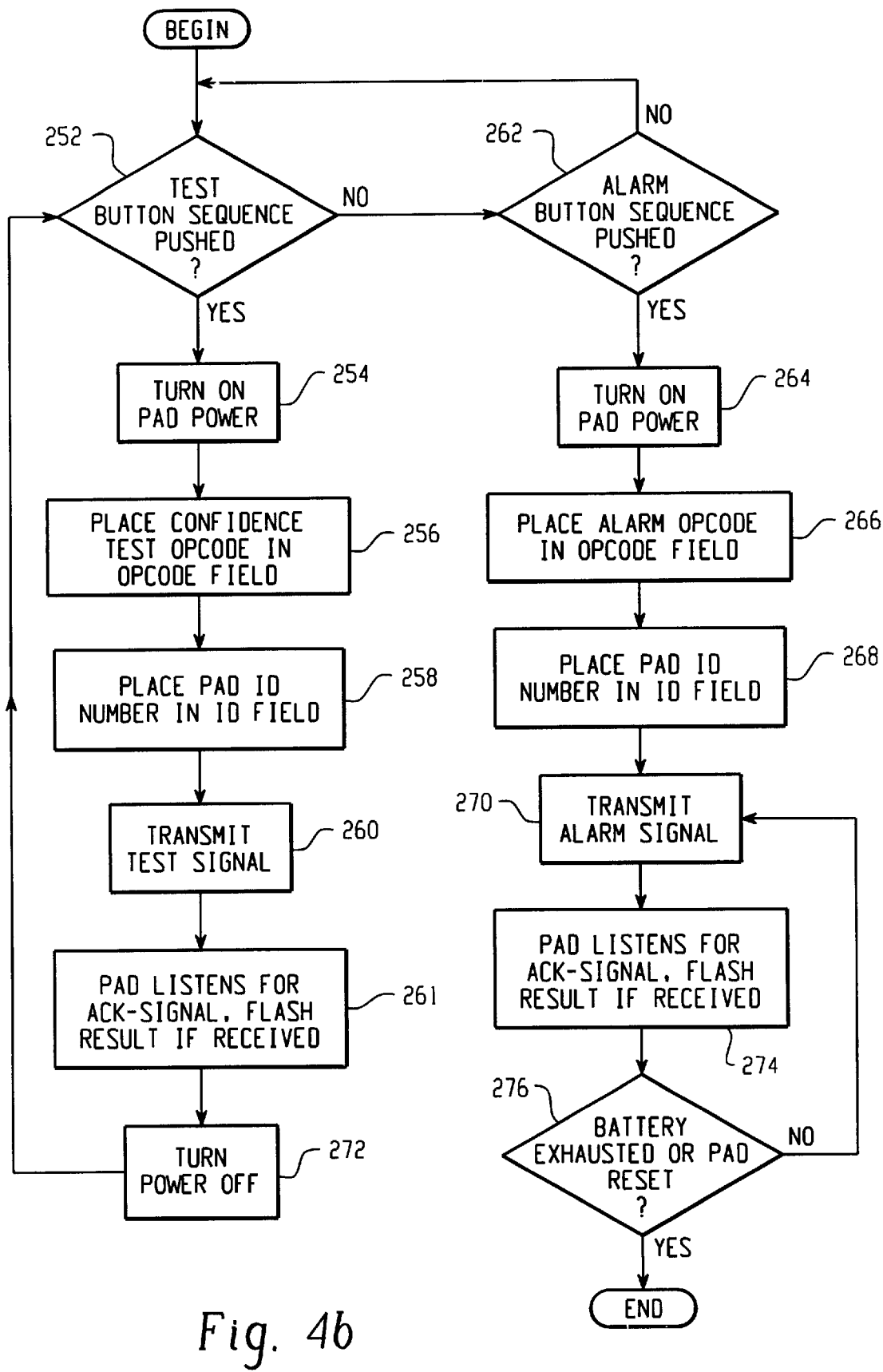
FIG. 4b is a flowchart depicting the transmit- and receive confirmation mode of the operation of the Personal Alarm Device (PAD) according to principles of the present invention.

Referring now to FIG. 4b, which depicts the operational flow diagram for another possible embodiment of the PAD. In this case the PAD behaves the same way as the embodiment depicted in FIG. 4a, when executing a confidence test transmission, but the alarm test transmission differs in that every alarm transmission burst is acknowledged in the same way that the confidence test transmission is confirmed. In this case the PAD listens at step 274 between alarm transmissions, on the last channel used for transmission, for the ACK signal, and when it gets an ACK, flashes the alarm indicator to confirm operation. The process continues again until either the battery is exhausted or the PAD is reset at step 276.

Figure 5:
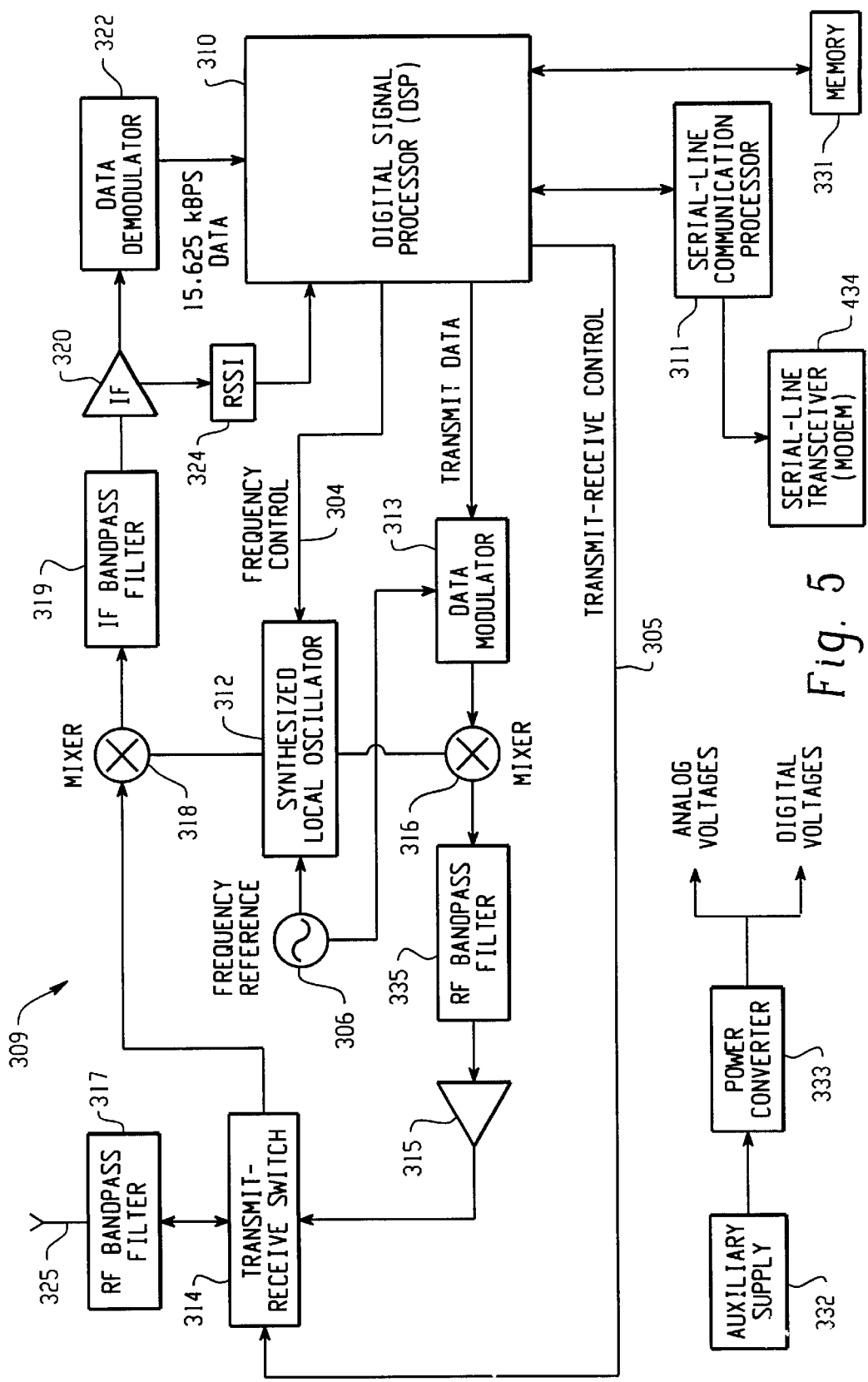
FIG. 5 is a block diagram of a Proximity Sensing Transceiver (PROX) according to principles of the present invention.

Referring now to FIG. 5, a PROX comprises a frequency-hopped spread spectrum transceiver 309. A digital signal processor (DSP) 310 manages all the activities of the transceiver 309, based on programs stored in a DSP memory 321. The programs implement the prioritized frequency-hopped CSMA communication protocols, the data coding function, the real-time transceiver control activities and interaction with the user interface which is a serial-line communication processor 311. The serial-line communication processor 311 communicates with a serial-line transceiver modem 334 which is coupled to a communication line.

To transmit a signal, the DSP 310 initializes a synthesized local oscillator 312 to the desired hop frequency via frequency control 304, as required by the frequency-hopping protocol, presents the data to be sent to a modulator 313, switches a transmit/receive (T/R) switch 314 to a "transmit" position via a transmit-receive control 305 and applies power to a power amplifier 315. The data is mixed with the signal from local oscillator 312 by a mixer 316, transmitted through a bandpass filter 317 which minimizes any unwanted noise and harmonics, and then sent through the amplifier 315. The signal then is then transmitted through the T/R switch 314 (which is in the "transmit" position), through a RF bandpass filter 335 which minimizes any unwanted noise or harmonics, and, finally, to an antenna 325 for transmission. The antenna 325 transmits and receives signals in the 902–928 MHz band.

When the DSP 310 requires reception, it routes signals from the antenna 325 through the bandpass filter 317, then through the T/R switch 314 which is set to a "receive" position via the control 305. The RF signal is mixed down to the desired 45 MHz and 455 Khz intermediate frequencies at a double conversion mixer 318 by a signal from the synthesized local oscillator 312, applied through a IF bandpass filter 319 and amplifier 320 where the absolute signal-strength is determined by calibrated relative signal strength indicator (RSSI) circuitry 324 and the signal is demodulated at 322 to yield a 15.625 KBPS data signal. The data is then decoded and signal-strength processed by the DSP 310, and further action is determined according to the stored programs in the DSP memory 321.

The power of the system is derived from a DC supply 332 which preferably has an output voltage of 24 volts. A power converter 333 converts the output voltage of supply to both analog and digital voltages which are used by the various elements in the PROX. The transmission-output power level is limited to less than one watt by the FCC standards for this band.

Interaction with the network is via a serial-line communication processor and suitable modem device. Two-way interaction occurs with the networks operations center via the concentrator and network hub.

Figure 6:
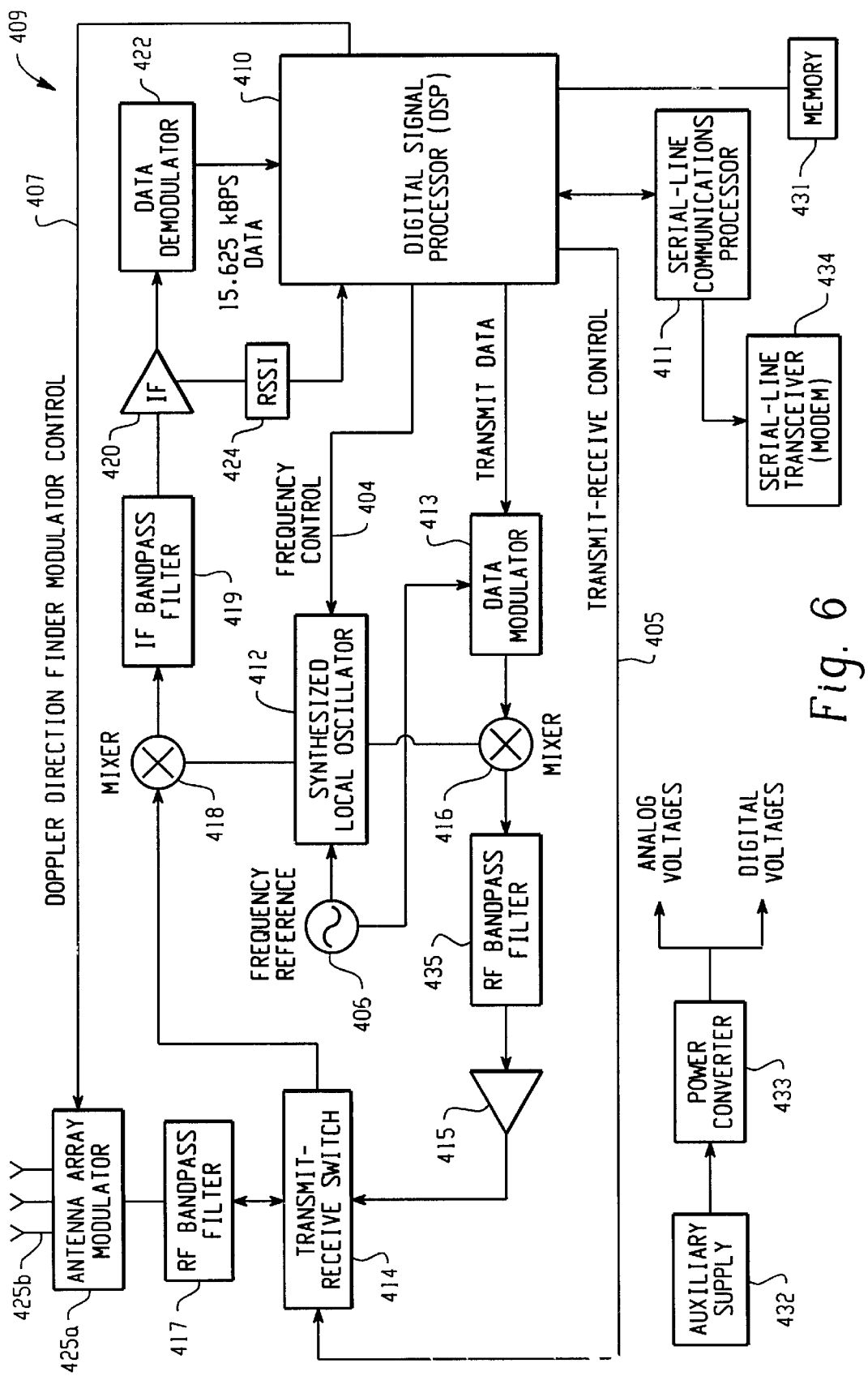
FIG. 6 is a block diagram of a Direction Finding Receiver (DFR) according to principles of the present invention.

Referring now to FIG. 6, a DFR comprises a frequency-hopped spread spectrum transceiver 409. A digital signal processor (DSP) 410 manages all the activities of the transceiver 409, based on programs stored in a DSP memory 421. The programs implement the prioritized frequency-hopped CSMA communication protocols, the data coding function, the real-time transceiver control activities and interaction with a serial-line communication processor 411. The serial line communication processor 411 communicates with a serial-line transceiver modem 434 which is coupled to a communication line. Interaction commands received from the serial communication processor 411 are converted into transmission or reception actions by the DSP 410.

To transmit a signal, the DSP 410 initializes a synthesized local oscillator 412 to the desired hop frequency, as required by the frequency-hopping protocol, presents the data to be sent to a modulator 413, switches a transmit/receive (T/R) switch 414 to a "transmit" position (via transmit-receive control signal 405) and applies power to a power amplifier 415. The modulated signal is up-converted by the signal from local oscillator 412 at mixer 416, filtered a bandpass filter 417 which minimizes any unwanted noise or harmonics, and then amplified at 415. The signal then is then switched at the T/R switch 414 (which is in the "transmit" position), through a RF bandpass filter 435 which minimizes any unwanted noise or harmonics, and, finally, to an antenna 425 for transmission. Both antennas operate in the 902–928 MHz band.

When the DSP 410 requires reception, it routes signals from the antenna 425b, through antenna array modulator 425a, RF bandpass filter 417, through the T/R switch 414 which is set to a "receive" position (via transmit-receive control signal 405), the RF signal is mixed down to the desired frequency to yield 45 MHz and 455 Khz intermediate frequencies at double mixer 418 by a signal from the synthesized local oscillator 412 (which is controlled by a frequency reference 406), applied through a IF bandpass filter 419 and amplifier 420 where the signal is demodulated by 422 to yield a 15.625 KBPS data signal and detected by RSSI circuitry at 424 to yield a signal strength estimate. The data is then decoded, and signal strength processed by the DSP 410. Further action is determined according to the stored programs in the DSP memory 421.

The modulator 425a and antenna array 425b with its accompanying modulator, and complimentary angle of arrival software in the DSP form a pseudo-Doppler direction-finder. The modulator 425a is controlled by a Doppler direct finder modulator control signal 406 from the DSP 410.

The signals from the antenna array are processed by the DSP 410. The processing extracts data from the signals, determines angle and time of arrival of each significant multi-path arrival and estimates the absolute signal strength. This data is then communicated through the serial-line communication processor 411, serial-line transceiver 434, and the NMS via any type of link such as a telephone line, or PTP microwave.

In the case of the DFR, the transmit function is used mainly for direction-finder calibration, acknowledgment signals, and network maintenance purposes, and so the transmitter is connected to the transmitter receiver switch 414.

Figure 7:
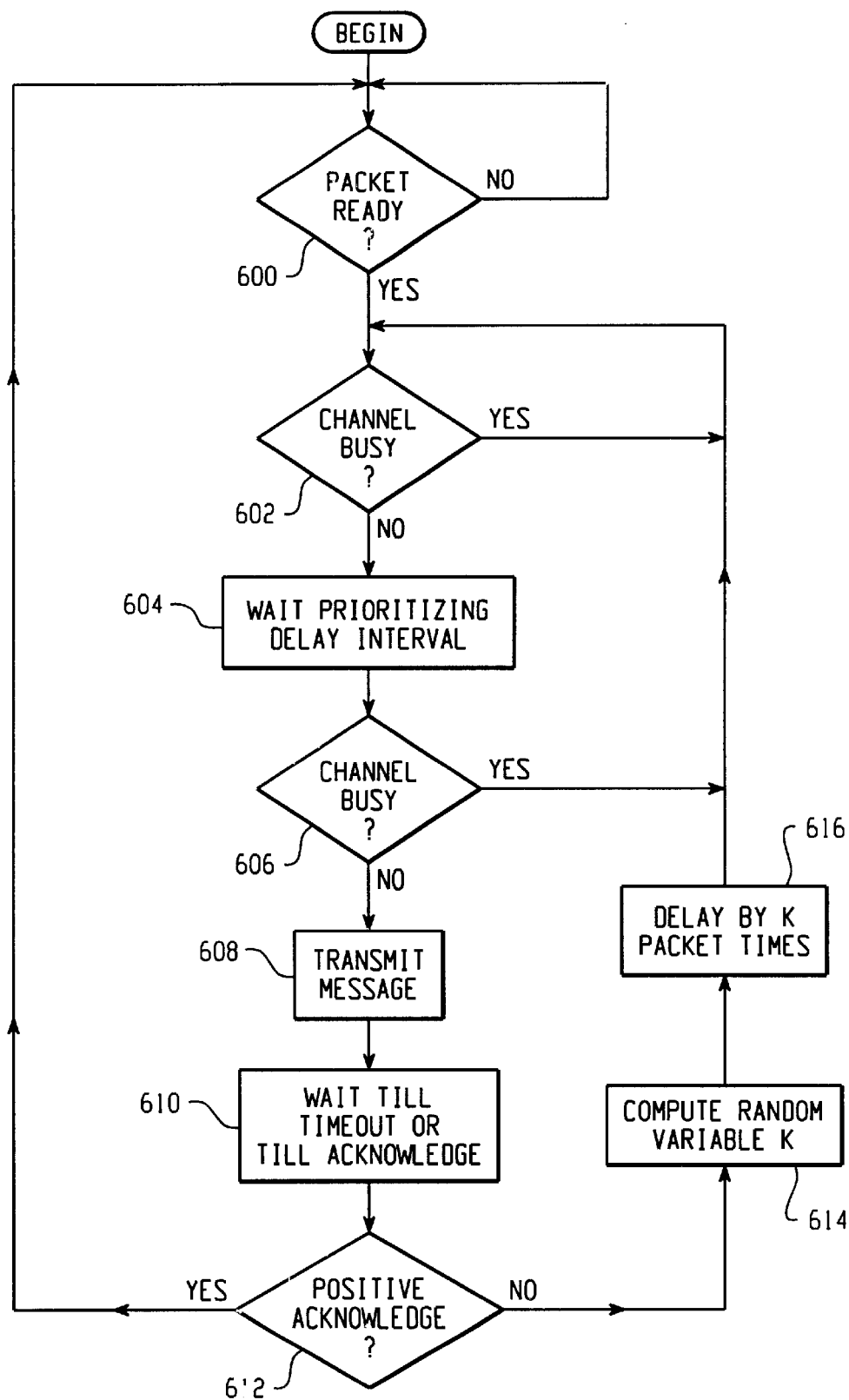
FIG. 7 depicts a flow diagram of the Priority-delay, Persistent-Carrier Sense Multiple Access (PDP-CSMA) technique according to the principles of the present invention.

Referring now to FIG. 7, which depicts a flow diagram of the prioritizing delay, persistent CSMA technique in accordance with this invention. A PAD initiates accessing of a communication channel at step 600, determining whether a data packet is ready to be sent. If negative, control waits by loops back to the same step. If affirmative, at step 602, the channel is sensed to determine whether it is busy. If the channel is busy, control loops back to step 602 and the channel is sensed until it is idle. However, when step 602 is negative, that is, the channel is idle, the device waits at step 604 for a specific interval (the priority-delay interval) before testing for idle again at step 606. If the channel is no longer idle, control returns to step 602 to wait for the channel to become idle again. However, if step 606 finds the channel idle, control continues with step 608 and the message is transmitted. In other words, only if the channel is still idle after the priority-delay interval will the device transmit on the channel. By choosing the delay duration values of the priority-delay in certain classes, it can be seen that a lower priority transmission, using a longer delay compared to a higher-priority transmission using a shorter delay, implicitly grants higher priority to that transmission by never gaining access to the transmission medium before offering the higher priority device an unobstructed opportunity to gain access first.

At step 608, the PAD transmits the message. Next, at step 610, the PAD waits till it receives an acknowledgment from the PROX or DFR that the packet has been correctly received, or until the maximum wait time has expired. If a positive ACK has been received by the PAD at step 612, control returns to step 600 where the PAD waits for the next packet to be sent.

The access mechanism of FIG. 7 uses a single communications channel which, in a shared band, may be occupied by other users or noise. Using a frequency-hopped spread spectrum technique allows the devices to both avoid signal degradation caused by interference that may already be present on the channel, and to avoid causing interference on a channel that is currently busy.

Figure 8:
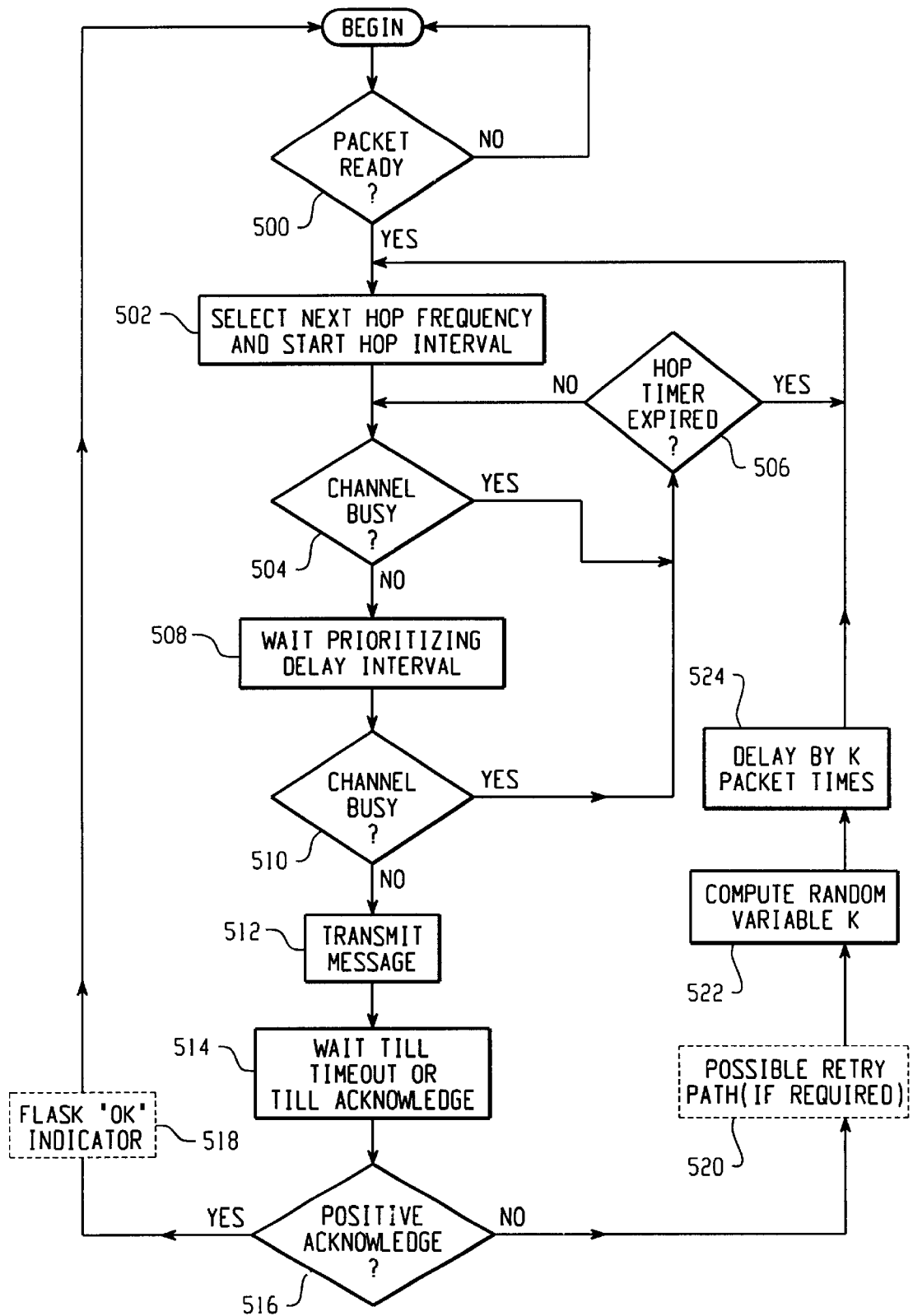
FIG. 8 depicts a flow diagram of the Priority-delay, Frequency-Hopped-Carrier Sense Multiple Access (PDFH-CSMA) technique according to principles of the present invention.

Referring now to FIG. 8, which depicts a flow diagram of the frequency-hopping, prioritizing-delay, persistent CSMA technique, according to this invention. At step 500 the PROX determines whether a packet is ready for transmission. If not, control passes back in a waiting loop to step 500 until a packet is ready. When step 500 is affirmative, the next hop frequency channel is selected at step 502 the PAD and the hop interval timer starts. Next, the device determines whether the channel is busy at step 504. If the channel is busy, the device determines whether the hop timer has expired at step 506. If the hop timer has expired, then control resumes at step 502 where a new hop channel is selected and the hop interval timer is reset. Thus steps 504 and 506 wait for the channel to become idle for up to one hop time.

If the answer to step 504 is negative (channel idle), then the device waits for a prioritizing delay interval before proceeding at step 508. After this delay, at step 510, the device again determines whether the channel is busy. If the answer to step 510 is affirmative (channel became busy during the wait), control returns to step 506. However, if the channel is still idle at step 510, control proceeds with step 512 where the message is transmitted. Next, at step 514, the device waits until it receives an ACK or until the maximum wait period times out. At step 516, the device determines whether an ACK has been received. If the answer to step 516 is positive, control proceeds to step 518 where a "OK" indicator is flashed on the PAD. Next, control returns to step 500. If the answer at step 516 is negative, then step 520 re-transmission is attempted. Next, at step 522, a random variable k is computed. Then, at step 524, the device waits for a delay of k milliseconds. Finally, control returns to step 502. Obvious variants of this scheme include that the there may be separate timers for hop interval (hop dwell time) and busy-channel time-out.

Figure 9:
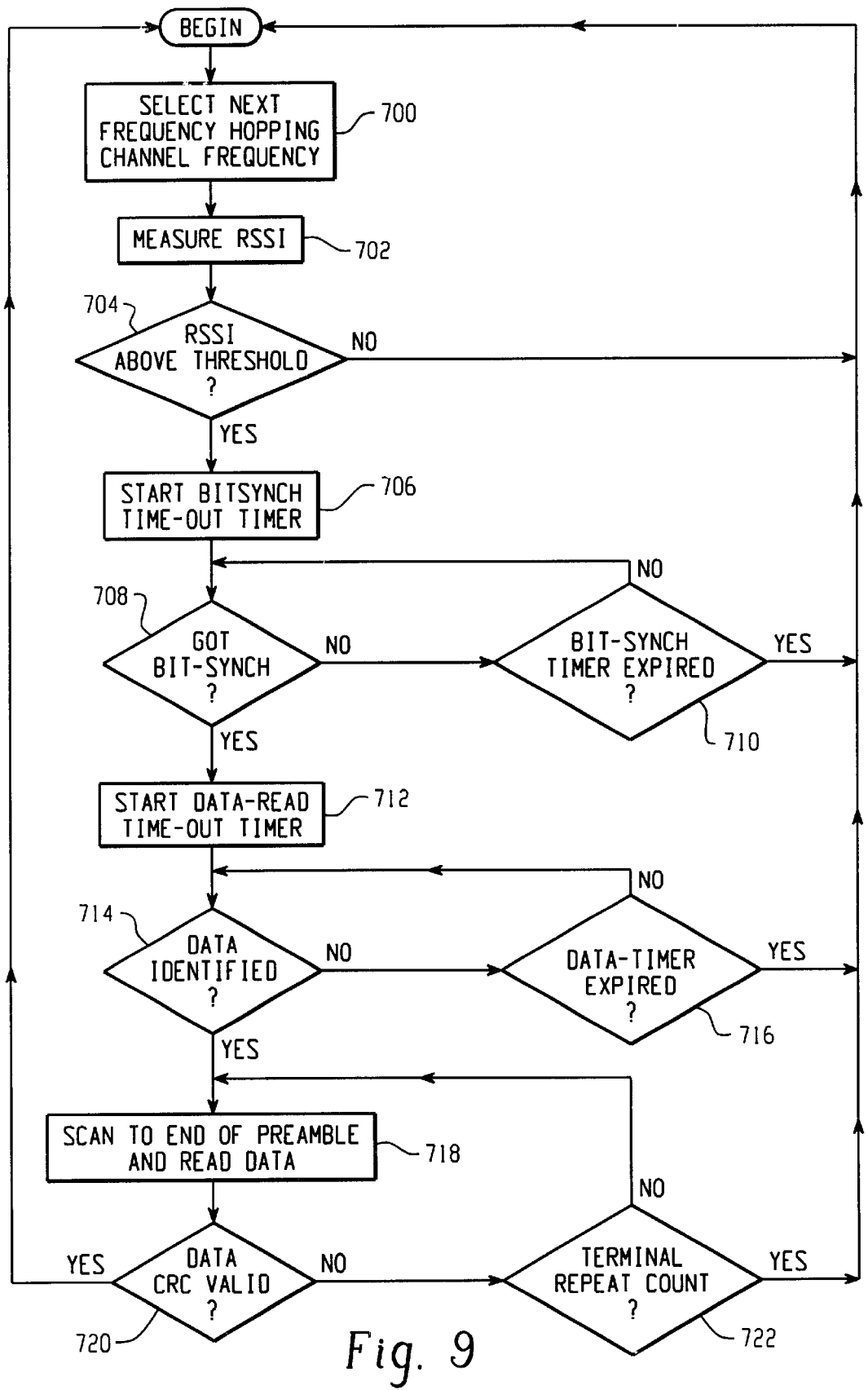
FIG. 9 depicts a flow diagram of the fast-scan mechanism used by the Tracking System network according to principles of the present invention.

Referring now to FIG. 9, depicting a flow diagram of fast-scanning algorithm used by the PROX and DFR transceivers. The scanning process begins at step 700 where the system measures the received signal strength indication (RSSI) on the next frequency hop channel. At step 702, the system determines whether the RSSI is above a threshold. If the answer is negative (implying an empty channel), the system returns to step 700 to hop to the next frequency. If the answer to step 704 is affirmative, then at step 706 the bit-synch time out timer is started.

Next, at step 708, the system determines whether bit-synch has been detected. If the answer to step 708 is negative (implying noise or incompatible signal modulation in the channel), then at step 710 the device determines if the bit-synch timer has expired. If the answer to step 710 is affirmative, then the system returns to step 700. On the other hand, if the answer at step 710 is negative, then the system returns to step 708, attempting to detect bit-synch till the bit-synch timer expires.

If the answer to step 708 is positive, then the system starts the data read time-out timer at step 712. Next, at step 714, the device determines whether the decoded data is identifiable. If the answer at step 714 is negative, then, at step 716, the system determines whether the data-read time-out timer has expired. If the answer is affirmative, control returns to step 700. If the answer is negative, then control returns to step 714 where identifiable data is searched for until the data-timer expires.

If the answer at step 714 is affirmative, then at step 718 the device scans to the end of the preamble in the data block and reads the data. Next, at step 720, the device determines whether the CRC contained in the data block validates the data. If the answer is affirmative, control returns to step 700. If the answer is negative, then at step 722, the device decides whether a terminal repeat count exists. If the answer at step 722 is negative, then control returns to step 718 where the data is re-read. On the other hand, if the answer to at step 722 is affirmative, then control returns to step 700.

For each empty channel (RSSI output low), the dwell time is very short—typically less than a millisecond. For an occupied channel (RSSI above threshold) with an incompatible transmission (bit synch failed), about 3 to 4 milliseconds is required. In the case of a compatible channel (bit synch obtained), between 10 and 15 milliseconds are required to properly decode the data, depending on when in the PAD transmission the PROX arrives on-channel. Therefore, even under the worst case load on the system, the PROX will have at least five opportunities to detect the confidence test transmission from any particular nearby PAD.

One result of using the access control mechanism of this invention is that all currently active system transmissions in a locality will tend to become accurately "serialized", avoiding collisions, and allowing the scanning operation of the PROX to accurately decode the data from the PAD's transmission. Also, allowing the PAD to "listen" for a significant interval (a few seconds) for an ACK from the PROX, allows the PROX to use the same access control mechanism and similar data structure to transmit the ACK to the PAD with a very low probability of signal loss due to collision with any interfering signals.

The NMS coordinates operations in the network and can be located at the CCC. The NMS communicates with the PROXs located in all the campus buildings, and the DFRs.

The NMS computes the estimated location of an alarm transmission (based on either the signal amplitude information from multiple PROX devices, or from the TOA or AOA information from the DFRs) and communicates that to the CCC. The NMS also keeps track of the system's performance and responds to commands and requests from the command and control center. Additionally, the NMS manages the moment-to-moment operation of the network. The NMS can be located with the CCC or at any remote location The NMS also maintains all the data bases for the network's operation, such as for subscriber records.

The CCC manages logistics of the network. Any and all of the information gathered by the NMS can be accessed and displayed at the command and control center. The NMS holds all network infrastructure databases while the CCC holds all user databases. This includes the location of any active alarms. The CCC displays the location of the PAD sending the alarm signal. The CCC keeps a log of all the PADs performing confidence tests, logging the time and date of each test, as well as the estimated location quality information. Maintenance of the network's data bases are also performed from the CCC.

Figure 10:
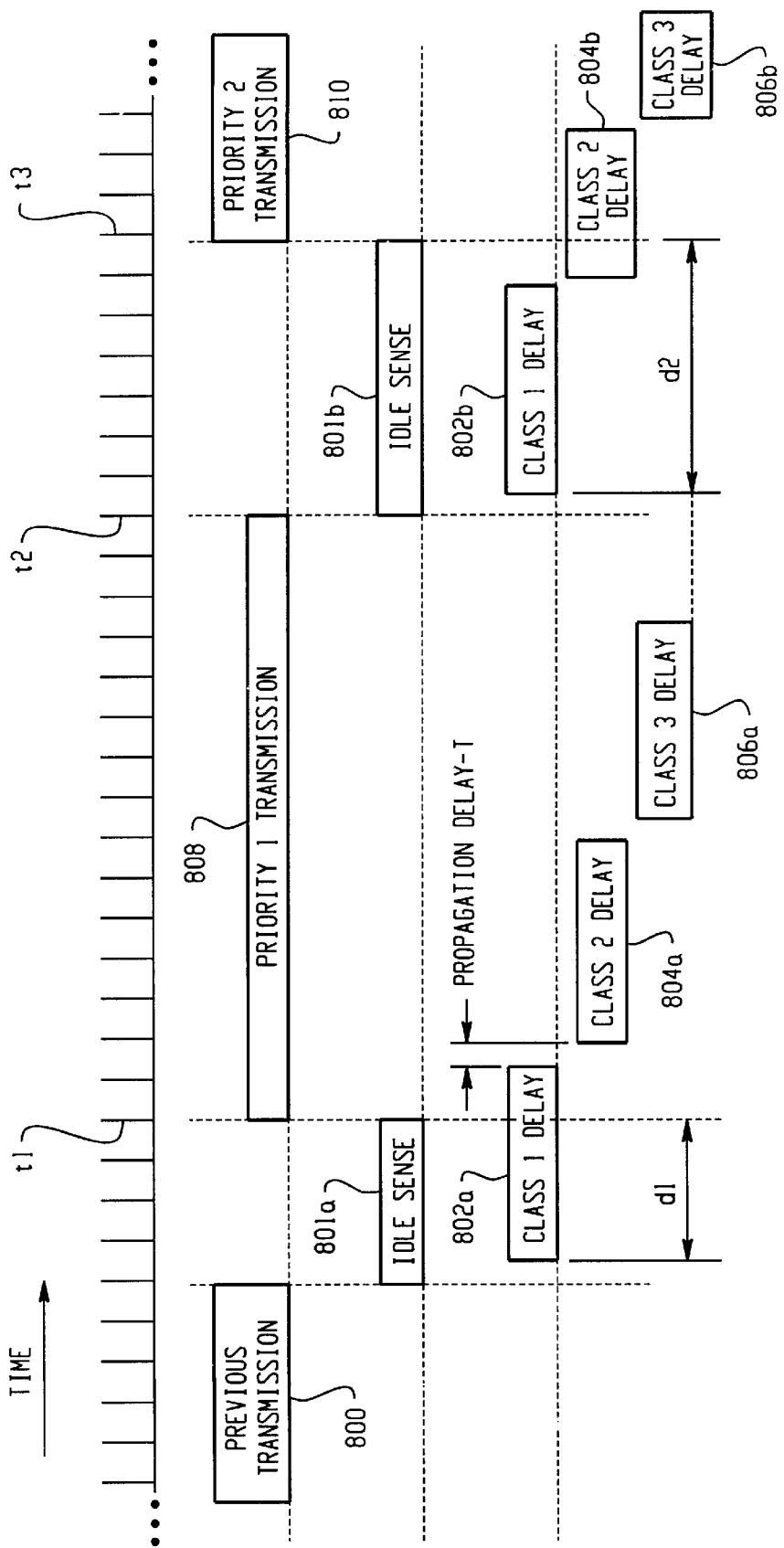
FIG. 10 depicts a time-diagram of the operation of the PDP-CSMA techniques network according to principles of the present invention.

Referring now to FIG. 10, the timeline of the operation of the system is illustrated. After a prior transmission in a time window 800 ends at time to, the receivers in the PROXs and DFRs sense the channel for traffic during time window 801a occurring between times $t_0$ to $t_1$.

Different time windows exist for a transmissions having different priorities. Transmissions with the highest priority begin during time windows 802a and 802b; transmissions with medium priority occur during time windows 804a and 804b; and transmissions with the lowest priority are initiated during time windows 806a and 806b. The highest priority transmissions are alarm calls; medium priority transmissions include confidence tests; and low priority transmissions include the sending of telemetry or paging data. Of course, any number of priority classes may be used.

Within time windows 802, 804, and 806, a device waits for a random delay time before beginning a transmission. For example, a transmission with a high priority waits for a random time period d1 in time window 802a before beginning a transmission at time $t_1$. Then the transmission by a PAD of the high priority transmission occurs during time window 808 between times $t_1$, and $t_2$ At time $t_2$, the PROXs and DFRs begin sensing the signal traffic on the channel again.

The DFRs and PROXs sense the channel's signal traffic in time window 801b between times $t_2$ and $t_3$. At time $t_3$, after waiting for a delay of time duration d2, a medium priority transmission is initiated during time window 804b. The transmission occurs during time window 810 between time $t_3$ and time $t_4$.

Figure 11:
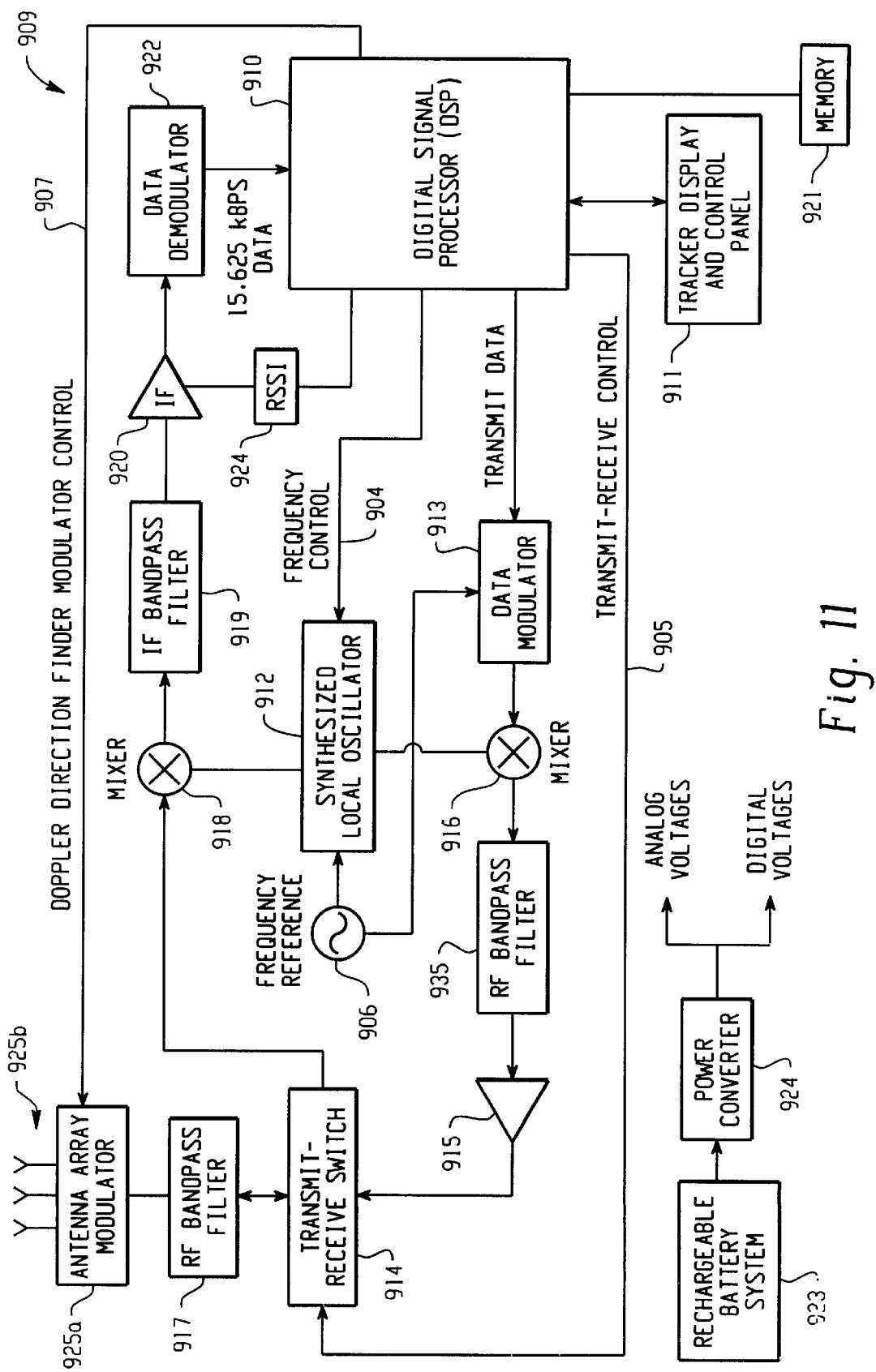
FIG. 11 is a block diagram of the Direction-Finding Tracker (DFT) according to principles of the present invention.

Referring now to FIG. 11, a DFT comprises a digital signal processor (DSP) 910 which manages all the activities of the transceiver 909, based on programs stored in a DSP memory 921. The programs implement the prioritized frequency-hopped CSMA communication protocols, the data coding function, the real-time transceiver control activities and interaction with a tracker display and control panel 911. Interaction commands received from the tracker display and control panel 911 are converted into transmission or reception actions by the DSP 910.

To transmit a signal, the DSP 910 initializes a synthesized local oscillator 912 to the desired hop frequency, as required by the frequency-hopping protocol, presents the data to be sent to a modulator 913, switches a transmit/receive (T/R) switch 914 to a "transmit" position (via transmit-receive control signal 905) and applies power to a power amplifier 915. The data is mixed with the signal from local oscillator 912 by a mixer 916, transmitted through a bandpass filter 935 which filters out unwanted signals, and then sent through the amplifier 915. The signal then is then transmitted to an antenna 925c for transmission. Both antennas operate in the 902–928 MHz band.

When the DSP 910 requires reception, it routes signals from the antenna 925b, through antenna array modulator 925a, RF bandpass filter 917, through the T/R switch 914 which is set to a "receive" position (via transmit-receive control signal 905), the RF signal is mixed down to the desired intermediate frequencies of 45 MHz and 455 Khz at double mixer 918 by a signal from the synthesized local oscillator 912 (which is supplied with a frequency reference 906), applied through a IF bandpass filter 919 and amplifier 920, where the signal absolute signal strength is estimated by calibrated RSSI circuitry, and on to the demodulator 922 where it is processed to yield a 15.625 KBPS data signal. The data is then decoded by the DSP 910, and further action is determined according to the stored programs in the DSP memory 921.

As with the DFR, the antenna 925b and its accompanying modulator 925a is a pseudo-Doppler direction-finder antenna array with complimentary control and angle of arrival software in the DSP. In the case of the DFT, the transmit function is used only for direction-finder calibration and network interaction purposes, and so the transmitter is connected to the transmitter receiver switch 914. The modulator 925a is controlled by a Doppler direct finder modulator control signal 906 from the DSP 910. Alternatively, a front-to-back ratio can be derived and used to determine location.

Figure 12:
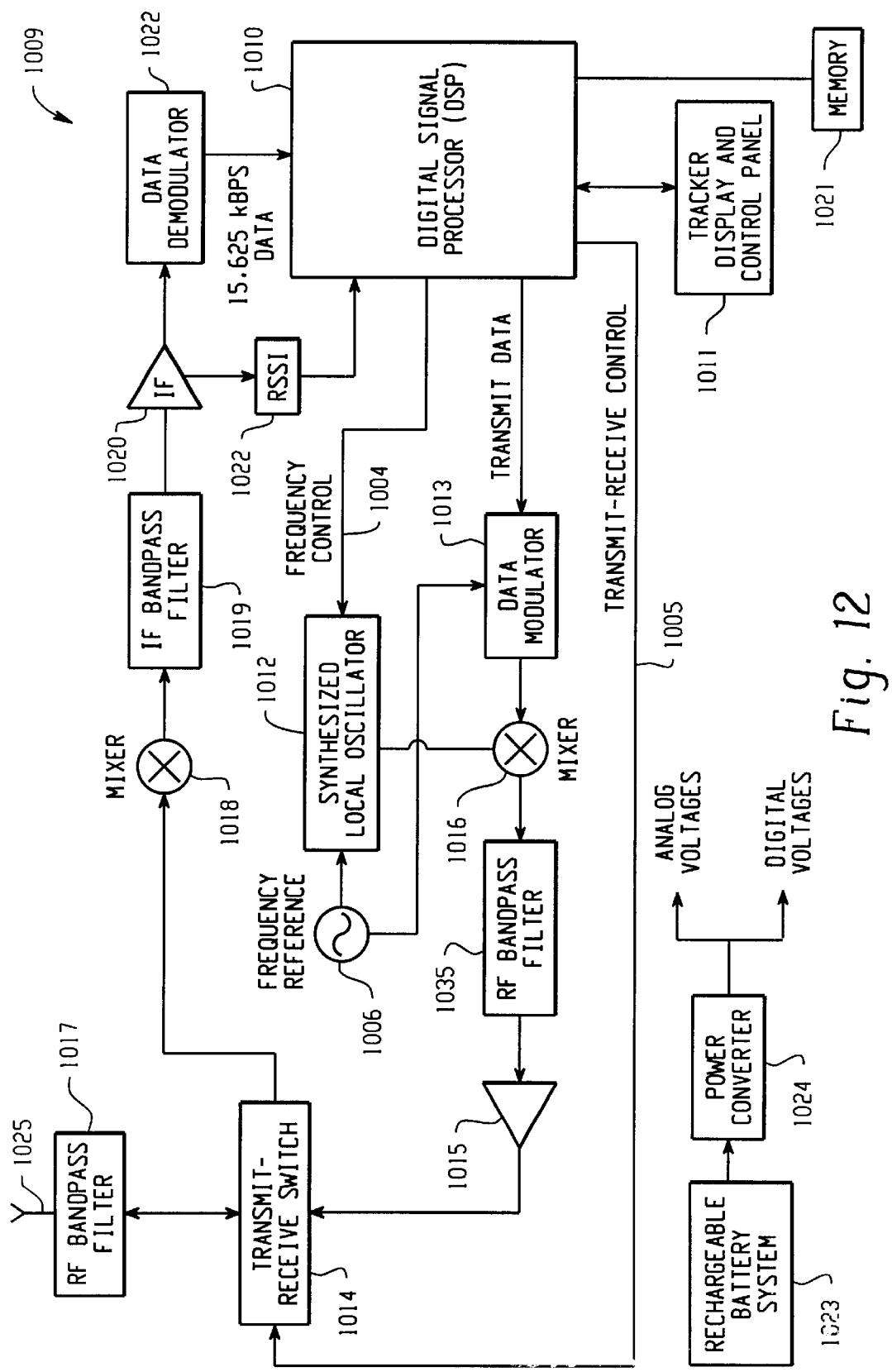
FIG. 12 is a block diagram of an alternate embodiment (using signal-strength only) of the Tracker according to principles of the present invention.

Referring now to FIG. 12, in an alternate embodiment a DFT comprises a digital signal processor (DSP) 1010 which manages all the activities of the transceiver 1009, based on programs stored in a DSP memory 1021. The programs implement the prioritized frequency-hopped CSMA communication protocols, the data coding function, the real-time transceiver control activities and interaction with a tracker display and control panel 1011. Interaction commands received from the tracker display and control panel 1011 are converted into transmission or reception actions by the DSP 1010.

To transmit a signal, the DSP 1010 initializes a synthesized local oscillator 1012 to the desired hop frequency, as required by the frequency-hopping protocol, presents the data to be sent to a modulator 1013, switches a transmit/receive (T/R) switch 1014 to a "transmit" position (via transmit-receive control signal 1005) and applies power to a power amplifier 1015. The data is mixed with the signal from local oscillator 1012 by a mixer 1016, transmitted through a bandpass filter 1035 which filters out unwanted signals, and then sent through the amplifier 1015. The signal then is then transmitted through the T/R switch 1014 (which is in the "transmit" position), through a RF bandpass filter 1017 which deletes any unwanted noise, and, finally, to an antenna 1025 for transmission. The antenna transmits and receives signals in the 902–928 MHz band.

When the DSP 1010 requires reception, it routes signals from the antenna 1025b, through antenna 1025, RF bandpass filter 1017, through the T/R switch 1014 which is set to a "receive" position (via transmit-receive control signal 1005), the RF signal is mixed down to a 45 MHz and 455 Khz intermediate frequencies at double mixer 1018 by a signal from the synthesized local oscillator 1012 (which is supplied with a frequency reference 1006), applied through a IF bandpass filter 1019 and amplifier 1020, where the signal absolute signal strength is estimated by calibrated RSSI circuitry, and on to the demodulator 1022 where it is processed to yield a 15.625 kBPS data signal. The data is then decoded and the signal strength estimates processed by the DSP 1010, and further action, such as information display and control panel interaction, is determined according to the stored programs in the DSP memory 1021.

Thus, a low interference-potential mechanism for multiple access by unsynchronized locator-transceivers using the frequency hopping techniques required for band-use is provided. Interference is significantly reduced while operating in the ISM band, which enhances communication reliability. A reliable spread-spectrum signaling technique is provided for tracking the location of the transceiver with a simple mechanism for prioritizing access of different classes of transmission. The system quickly and reliably locates people using the radio-transceiver and allows security personnel to quickly come to the aid of people who experience a threat to their personal safety anywhere in or near a campus or similar environment. A device is provided which transmits an identification signal that can be remotely located and tracked with enough precision for security personnel to quickly come to their aid. The system is reliable, robust, and user-friendly and offers an on-demand confidence-test feature. Interference is effectively managed or controlled or avoided, thereby ensuring communications-reliability, while still maximizing the throughput of the system which uses of a number of different wireless locating technologies and shared transmission bands.

While the present invention has been described with reference to one or more preferred embodiments, those skilled in the art will recognize that many changes may be made thereto without departing from the spirit and scope of the present invention which is set forth in the following claims.

What is claimed is:

1. A frequency hopping spread spectrum method for communicating a message, the steps comprising the following steps in the sequence set forth:
   A) assigning a priority to the message;
   B) selecting a frequency and setting a timer to a hop interval and starting the timer;
   C) sensing a channel at the selected frequency;
   D) waiting an interval based on the priority of the message, restarting the process at step B) whenever the timer expires and the channel has not been clear for the interval, wherein a new frequency is selected and the timer is restarted;
   E) transmitting the message if the selected frequency is still clear;
   F) waiting until an occurrence of at least one of an acknowledgment is received and the timer expires; and
   G) repeating steps B) through F) when at least one of the message was not transmitted in step E) and the acknowledgment was not received in step F) occurs, wherein a different frequency is selected each time step B) is repeated.

2. The frequency hopping spread spectrum method for communicating a message, as in claim 1, wherein the frequency is selected randomly.

3. The frequency hopping spread spectrum method for communicating a message, as in claim 1, wherein the frequency is selected from a predefined table.

4. The frequency hopping spread spectrum method for communicating a message, as in claim 1, the sensing step further comprises selecting another frequency and resetting the timer to the hop interval when the channel is busy and the timer has expired.

5. The frequency hopping spread spectrum method for communicating a message, as in claim 4, wherein the another frequency is selected randomly.

6. The frequency hopping spread spectrum method for communicating a message, as in claim 4, wherein the another frequency is selected from a predefined table.

7. The frequency hopping spread spectrum method for communicating a message, as in claim 1, further comprising, providing feedback indicating that the message was received.

8. The frequency hopping spread spectrum method for communicating a message, as in claim 1, wherein the another frequency is selected randomly.

9. The frequency hopping spread spectrum method for communicating a message, as in claim 1, wherein the another frequency is selected from a predefined table.

10. The frequency hopping spread spectrum method for communicating a message, as in claim 1, wherein the selected frequency is in the 902–928 MHz ISM band.

11. The frequency hopping spread spectrum method for communicating a message, as in claim 1, wherein the selected frequency is chosen from a set at least of fifty pre-selected frequencies.

12. The frequency hopping spread spectrum method for communicating a message, as in claim 1, wherein the message is a data packet, the data packet comprising:
   a) a bit synch and timing preamble;
   b) a checksum;
   c) an opcode;
   d) a repeat count and hop count filed;
   e) a transmitter identifier field.

13. An apparatus for transmitting a message using frequency hopping spread spectrum, comprising:
   communication means for communicating a message and sensing a channel at a selected frequency;
   signal processing means operatively coupled to the communication means, the signal processing means programmed to perform the following functions in the sequence set forth:
   a) assigning a priority to a message,
   b) selecting a frequency and setting a timer to a hop interval and starting the timer
   c) receiving from the sensing means, the availability of the channel, the signal processing means selecting a new frequency if the channel is unavailable and the timer expired;
   d) waiting an interval based on the priority of the message and receiving from the sensing means the availability of the channel, the signal processing means selecting a new frequency and resetting the timer when the channel is unavailable and the timer has expired; and,
   e) causing the transmission means to send the message if the channel is clear;
   f) waiting for an acknowledgment to the message;
   g) repeating steps b) through f) when at least one of the message is not sent in step e) and the acknowledgment is not received in step f), wherein a new frequency is selected and the timer is restarted each time step b) is repeated.

14. Computer readable instructions on a computer readable medium, consisting of:

A) computer readable instructions for assigning a priority to the message;
B) computer readable instructions for selecting a frequency, setting a timer to a hop interval and starting the timer;
C) computer readable instructions for receiving sensing data for a channel at the selected frequency;
D) computer readable instructions for waiting an interval based on the priority of the message, wherein a new frequency is selected and the timer is restarted when the timer has expired and the channel has not been available for a time period at least equal to the interval;
E) computer readable instructions for transmitting the message if the channel is still clear;
F) computer readable instructions for waiting until an occurrence of at least one of an acknowledgment is received and the timer expires; and
G) computer readable instructions for repeating steps B) through F) upon the occurrence of at least one of the message not being sent in step E) and an acknowledgment is not received in step F), wherein a new frequency is selected each time step B) is repeated.

* * * * *